C. W. GRAHAM.
MACHINE FOR POSITIONING AND CUTTING FISH.
APPLICATION FILED NOV. 12, 1917.

1,381,989.

Patented June 21, 1921.
5 SHEETS—SHEET 1.

C. W. GRAHAM.
MACHINE FOR POSITIONING AND CUTTING FISH.
APPLICATION FILED NOV. 12, 1917.

1,381,989.

Patented June 21, 1921.
5 SHEETS—SHEET 2.

C. W. GRAHAM.
MACHINE FOR POSITIONING AND CUTTING FISH.
APPLICATION FILED NOV. 12, 1917.

1,381,989.

Patented June 21, 1921.

C. W. GRAHAM.
MACHINE FOR POSITIONING AND CUTTING FISH.
APPLICATION FILED NOV. 12, 1917.
1,381,989.
Patented June 21, 1921.
5 SHEETS—SHEET 4.
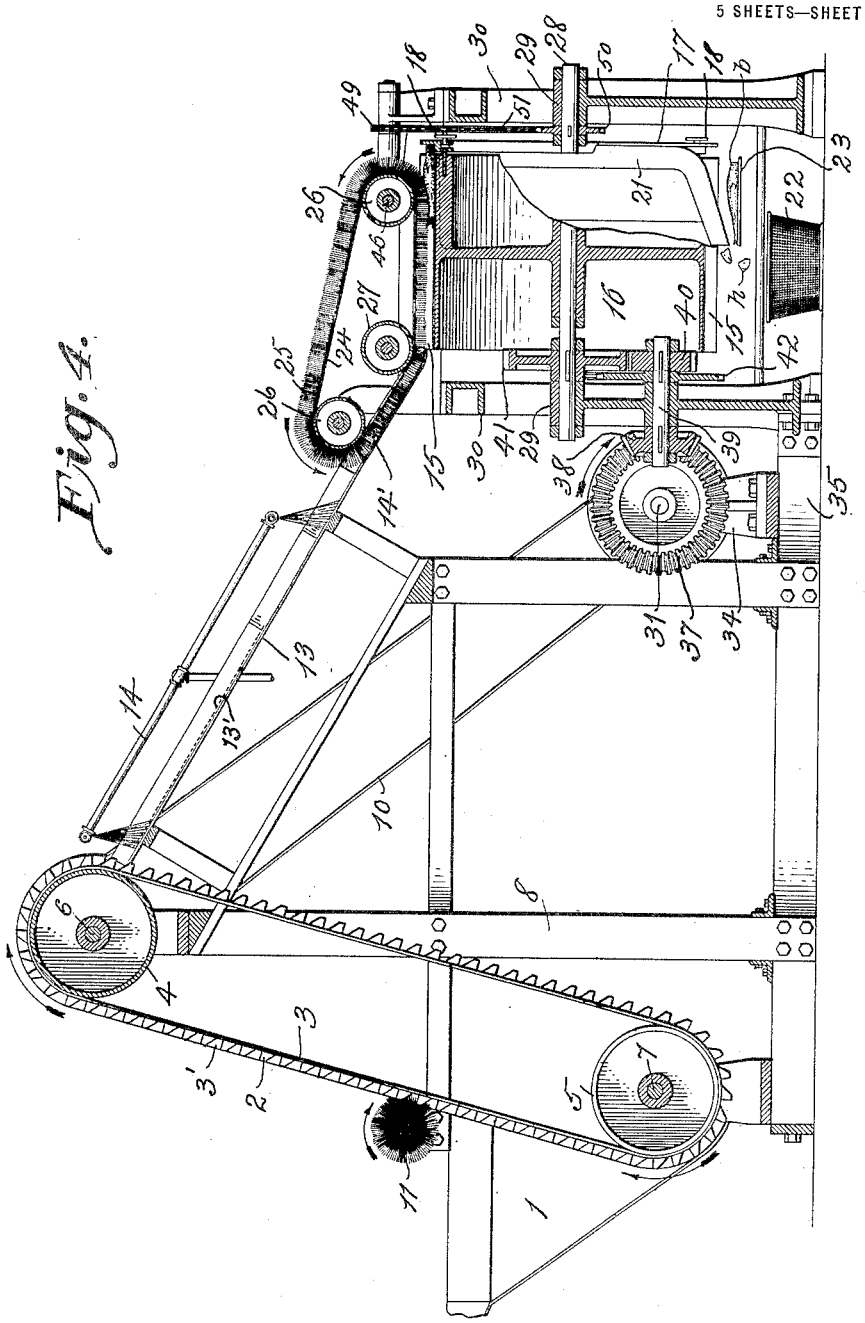
INVENTOR
C. W. Graham
BY
H. N. Low
ATTORNEY C. W. GRAHAM.
MACHINE FOR POSITIONING AND CUTTING FISH.
APPLICATION FILED NOV. 12, 1917.

1,381,989.

Patented June 21, 1921.
5 SHEETS—SHEET 5.

UNITED STATES PATENT OFFICE.

CHARLES W. GRAHAM, OF ALLENDALE, NEW JERSEY, ASSIGNOR TO AMERICAN CAN COMPANY, A CORPORATION OF NEW JERSEY.

MACHINE FOR POSITIONING AND CUTTING FISH.

1,381,989. Specification of Letters Patent. Patented June 21, 1921.

Application filed November 12, 1917. Serial No. 201,514.

*To all whom it may concern:*

Be it known that I, CHARLES W. GRAHAM, a citizen of the United States, residing at Allendale, in the county of Bergen and State of New Jersey, have invented certain new and useful Improvements in Machines for Positioning and Cutting Fish, of which the following is a specification.

The invention relates to the selection and feeding of fish from a mass of the same in such manner that they are rapidly and uniformly presented to a decapitating knife, and are thence conveyed for further treatment, as may be desired.

With such other object in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Fig. 4 is a longitudinal sectional view on line IV—IV of Fig. 3.

Fig. 7 is a partial end view of the delivery end of the machine illustrating the delivery of the decapitated parts.

Figure 2:
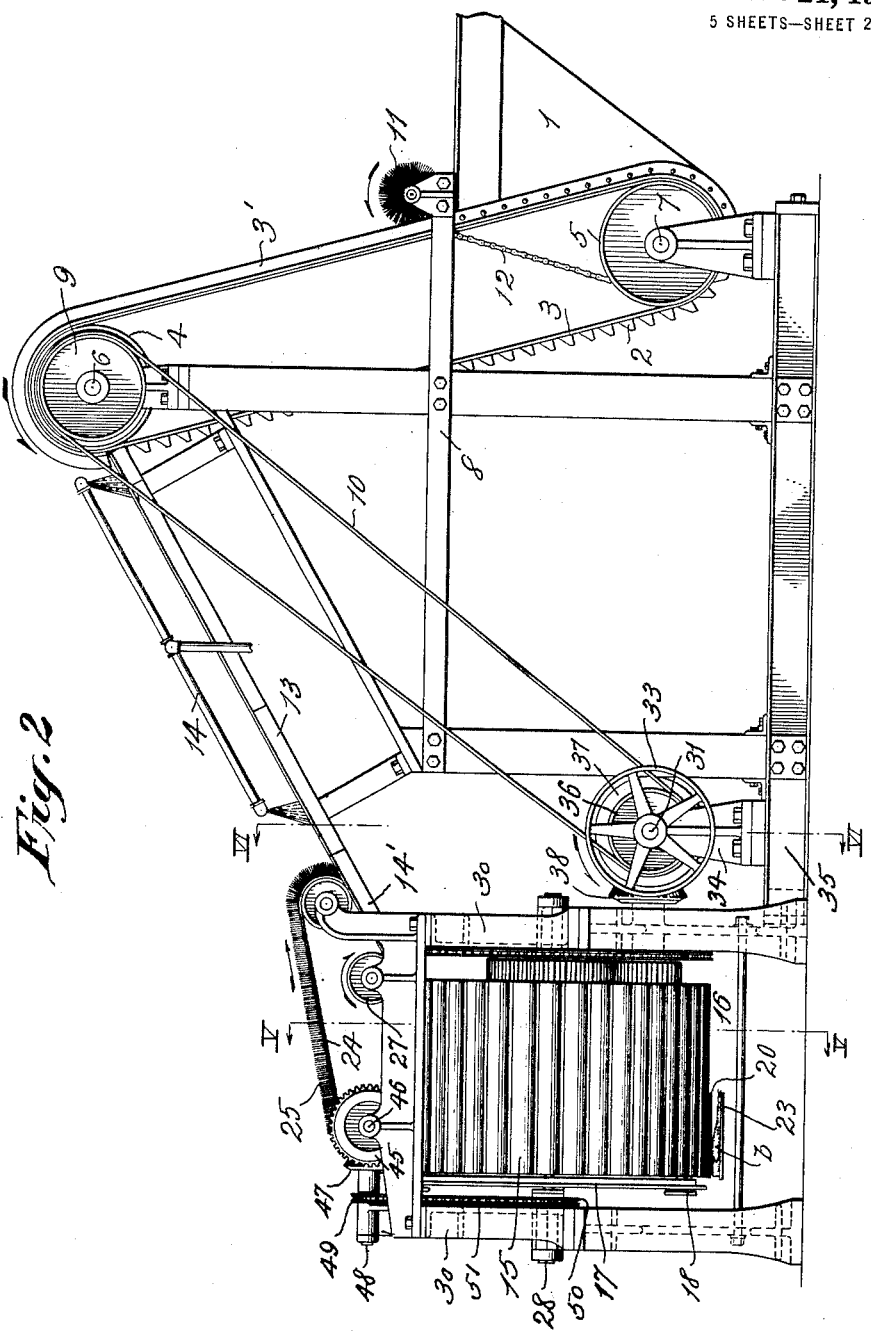
Fig. 2 is a side view of the same.
Figure 3:
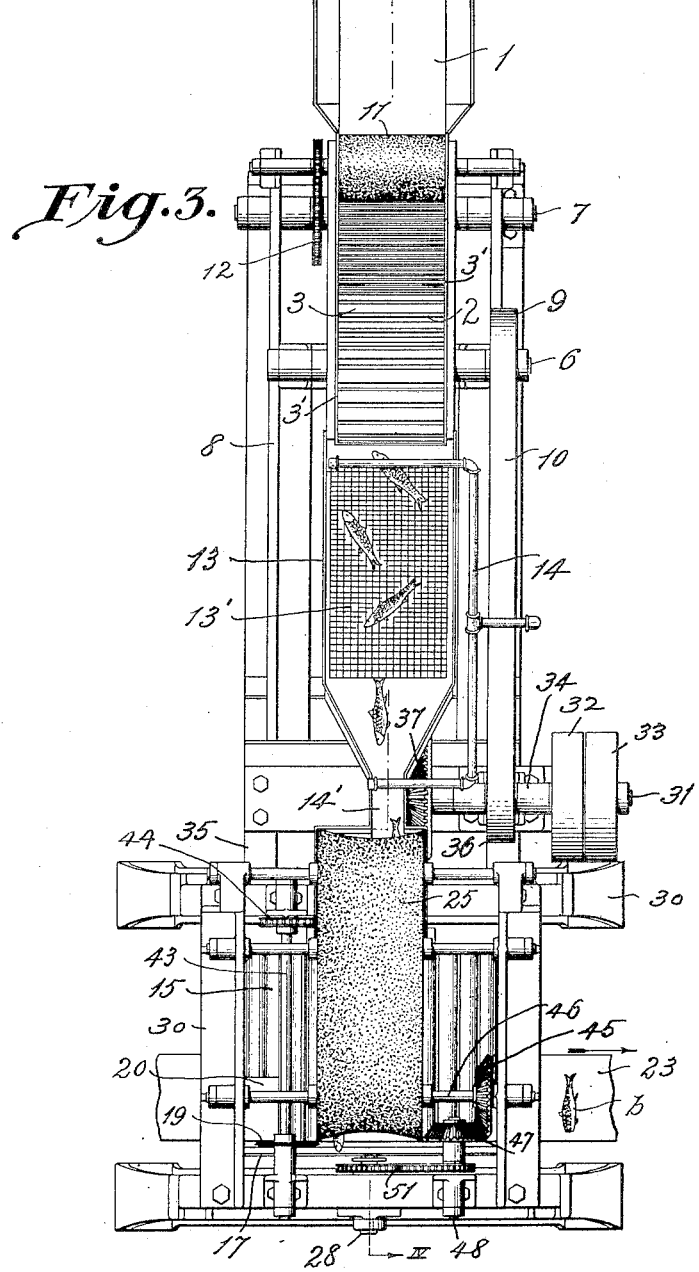
Fig. 3 is a top plan view.
Figure 6:
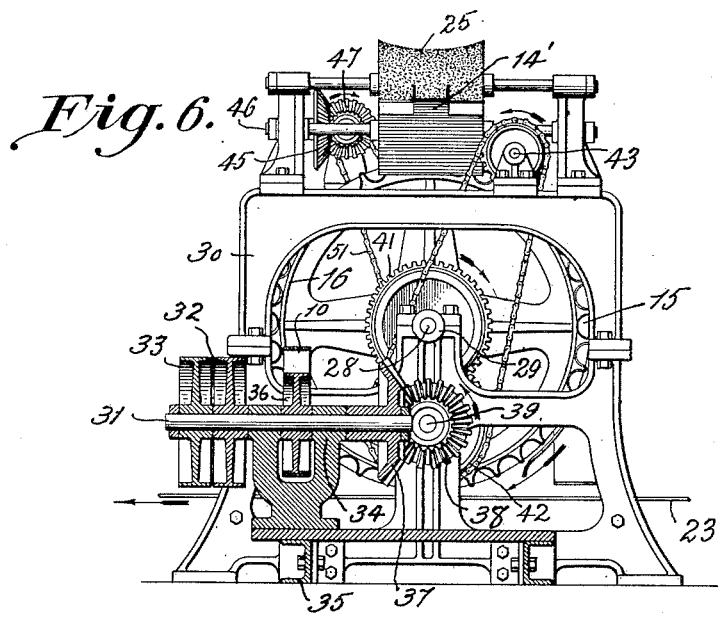
Fig. 6 is a cross sectional view on line VI—VI of Fig. 2.

Referring to the drawings, 1 is a hopper into which the fish to be treated are delivered or dumped in mass, and from which the fish are automatically selected one by one and are arranged in parallelism by flights 2 on a conveying and elevating belt 3, the fish being confined endwise on said flights by side-boards 3'. Said belt is actuated by upper and lower drums 4 and 5 mounted respectively on shafts 6 and 7, these shafts being supported in suitable bearings on the frame 8, and the shaft 6 being driven by a pulley 9 and belt 10. Coacting with the said conveying elements is a rotary brush 11 the bristles of which act to push the fish securely on to the flights 2 as the latter emerge from the hopper 1, whereby the fish are positioned transversely to their direction of travel, and are in such position when they are delivered by the conveyer to the slide 13. This brush has also a cleaning function, being turned in a direction opposite to that of the movement of the conveyer (as shown by the arrows), and also throws down into the hopper any excess of fish which may cling to the flights 2, the object being to distribute the fish evenly on the elevator, approximately one fish to each flight; but the invention is not limited to such exact distribution especially in the case of small fish. The brush 11 is rotated as described from shaft 7 by a chain or belt 12 (Figs. 2 and 3) running on suitable sprockets. As the selected and elevated fish are carried over the top of the conveyer they are deposited on an inclined support and slide 13 on which they move downward by gravity. Said conveyer deposits them on the slide in a position transverse to the direction of travel, the fish having been pushed into a transverse position by the action of the brush 11, but not ordinarily arranged with their heads all in the same direction. But as they progress down the slide 13 (Fig. 3) the fish turn head downwards and they all leave the slide in such position. 14 is a water or spray pipe which may be used to keep the slide slippery in case the fish are not wet enough for rapid sliding and 13' is a grid or wire netting or roughened surface to retard and insure the turning of the fish by the time they reach the bottom of the slide.

Figure 5:
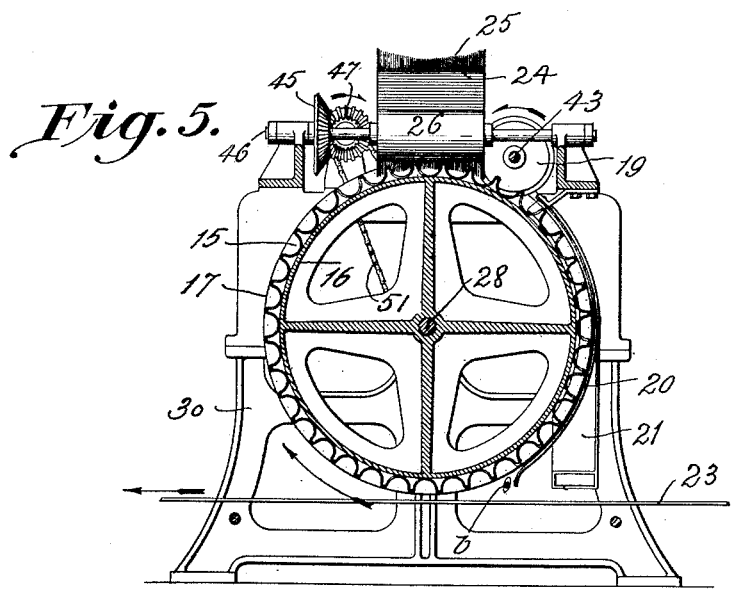
Fig. 5 is a cross sectional view on line V—V of Fig. 2.

From said slide the fish are directed through a chute 14' into a series of transversely moving channels or grooves 15, which in the construction illustrated are carried by a rotary drum 16 which has at the farther end a gage plate 17. It is to be understood however that the invention is not confined to the use of a drum for carrying said channels. This gage is adjustable longitudinally of the drum by hand screws 18 to determine the proper plane at which to arrest the fish relative to the rotary decapitating knife 19, according to the size of the fish and average length of their heads. The rotations of the drum and of the knife (see arrows in Figs. 5 and 7) cause the fish to be rapidly and accurately decapitated and their bodies *b* are for a part of the revolution of the drum retained in the channels 15 by a shield 20, while the heads *h* are caught in a chute 21 and conducted to a collecting vessel 22 (Fig. 4). The bodies *b* pass from between the drum and the shield 20 (Figs. 5 and 7) and are received on a conveyer belt 23 by which they are discharged for any further necessary operations.

Figure 1:
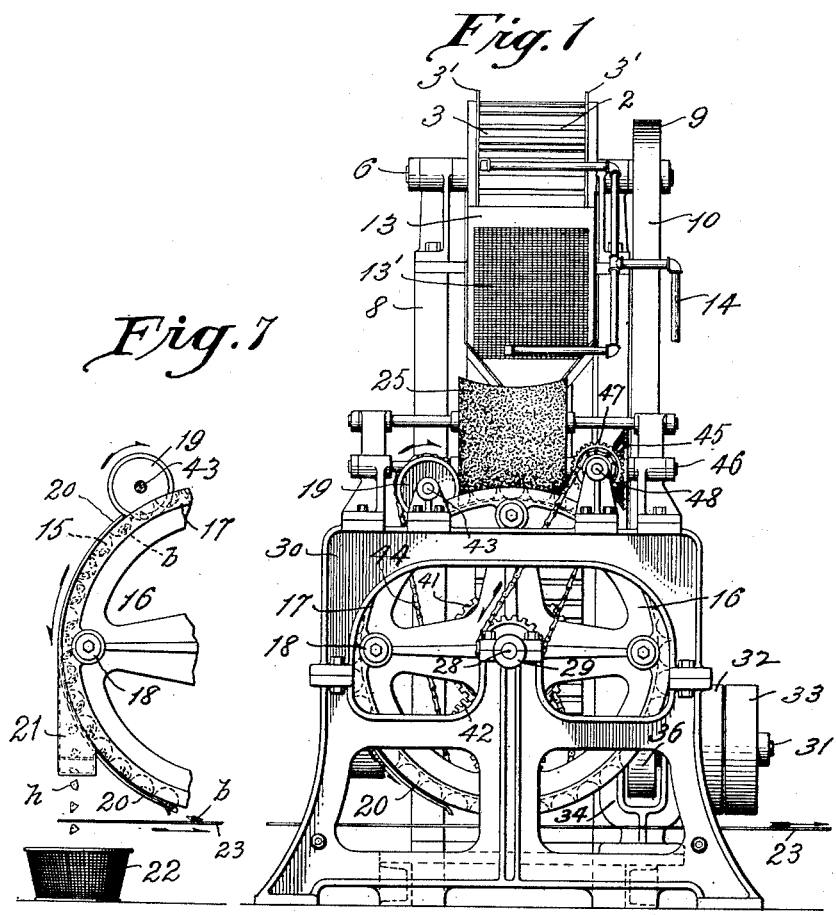
Figure 1 is an end view, of the delivery end of the machine, of an apparatus embodying the invention.

24 is a continuously moving flexible belt provided with stiff bristles 25 and arranged over the lower end of the inclined chute 14' and over the top of the drum 16, and operating to push the fish along head first against the gage 17 (Fig. 4). The brush formed by the bristles 25 is conformed exteriorly with the drum 16 (Fig. 1) so that it acts evenly on the fish as they are passed along the drum and at the same time toward the descending side of the drum. This conformation may be accomplished by making the forward drum 26 and the drum 27 concave so that their surfaces are parallel with the periphery of the drum 16; or this may be accomplished by making the bristles 25 of different lengths (Fig. 5), the latter construction being illustrated. The ends of the belt 24 are mounted on drums 26 arranged at proper distances from the chute and drum 16, and the lower limb of the belt is held depressed by a drum 27 (Fig. 4) arranged at the juncture of the chute and the channels 15, so that the rear part of said limb is maintained parallel with the chute and the forward part is held parallel with said channels.

It will be understood that the rear part of the brush 24, 25 constitutes means for positively propelling and delivering the fish on the slide and head first into the said channels, and the forward part of the brush constitutes means for engaging and propelling the fish while in said channels.

The parts above set forth are conveniently constructed, supported and actuated as below described, but the invention is not necessarily limited to such details: The slide and chute are carried on said frame 8. The drum 16 is fixed on a shaft 28 mounted in bearings 29 on a frame 30, and the channels 15 are formed by corrugated sheet metal attached to the exterior of the drum. The brush drums 26, 27 are suitably mounted on the frame 30. The main driving shaft is shown at 31 having fast and loose pulleys 32, 33 and mounted in bearings 34 fixed on a lower frame portion 35 which connects the frames 8 and 30. The shaft 31 has fixed thereon a pulley 36 which drives said belt 10 and the elevator 3; also a bevel gear 37 which drives a bevel pinion 38 on a short shaft 39 mounted in the frame 30. This short shaft has fixed on it (Fig. 4) a pinion 40 which drives the drum 16 by a gear wheel 41 on the drum shaft 28; also a sprocket 42 which drives the shaft 43 of the decapitating knife by a chain 44. The shaft 43 is mounted in bearings 44 on the frame 30. The brush 24, 25 is driven by its forward drum 26 and a bevel gear 45 on the shaft 46 of the same, said gear meshing with a bevel gear 47 on a short shaft 48 mounted on the frame 30. The latter shaft is driven from the drum shaft 28 by sprockets 49, 50 and a chain 51 (Fig. 4).

I may state that the propelling device 24, 25 is suitable for operating on fish in the channels of a flat endless belt (in place of the drum 16), in which case the fish-engaging and propelling surface will be cylindrical, instead of concave as shown in Figs. 1, 3, 5 and 6.

What I claim is:

1. In a machine for handling fish, the combination of a positioning slide on which the fish automatically turn and are propelled head first by gravity means for delivering fish to said slide, movable channels for receiving the fish from said slide and arranged to eliminate the force of gravity as a propelling means and extending in the same general direction as the direction of movement of the fish when on said slide, means for moving the channels across said direction of movement so that they receive fish successively from the slide, means for positively continuing the initial sliding of the fish and propelling them in said channels, and decapitating means for operating on the fish when finally positioned.

2. In a machine for handling fish, the combination of a series of channels, means for moving said channels in a direction transverse to the direction of their length, a support for the fish, means for propelling and delivering fish in a direction parallel with said channels and head first into the ends of said channels, said means being movable in the direction of the entering movement of the fish for engaging and propelling the fish while in said channels, a gage against which the heads of the fish are so propelled, and means for discharging the fish.

3. In a machine for handling fish, the combination of a series of channels, means for moving said channels in a direction transverse to the direction of their length, a support for the fish, means for propelling and delivering fish in a direction parallel with said channels and head first into the ends of said channels, said means engaging and propelling the fish in the direction of their original movement and while in said channels, a gage against which the heads of the fish are so propelled, and decapitating means.

4. In a machine for handling fish, the combination of a series of channels, means for moving said channels in a direction transverse to the direction of their length, a support for the fish, means for propelling and delivering fish in a direction parallel with said channels and head first into the ends of said channels, comprising resilient means movable in the direction of the entering movement of the fish for engaging and propelling the fish while in said channels, a gage against which the heads of the fish are so propelled, and decapitating means.

5. In a machine for handling fish, the combination of a series of channels, means for moving said channels in a direction transverse to the direction of their length, a support for the fish, means for propelling and delivering fish in a direction parallel with said channels and head first into the ends of said channels, comprising a brush movable in the direction of the entering movement of the fish for engaging and propelling the fish while in said channels, a gage against which the heads of the fish are so propelled, and decapitating means.

6. In a machine for handling fish, the combination of a series of channels, means for moving said channels in a direction transverse to the direction of their length, a support for the fish, means for propelling and delivering fish in a direction parallel with said channels and head first into the ends of said channels, comprising a moving brush across which said channels are moved, for engaging and propelling the fish while in said channels, a gage against which the heads of the fish are so propelled, and decapitating means.

7. In a machine for handling fish, the combination of a series of channels, means for moving said channels in a direction transverse to the direction of their length, a support for the fish, means for propelling and delivering fish in a direction parallel with said channels and head first into the ends of said channels comprising an endless moving belt having a brush across which said channels are moved for engaging and propelling the fish while in said channels, a gage against which the heads of the fish are so propelled, and decapitating means.

8. In a machine for handling fish, the combination of a series of channels, a drum having a horizontal surface carrying said channels, means for moving said drum in a direction transverse to said channels, a support for the fish, means for propelling and delivering fish in a direction parallel with said channels and head first into the ends of said channels comprising means for engaging and propelling the fish while in said channels, a gage against which the heads of the fish are so propelled, and means for discharging the fish.

9. The combination of a fish-positioning slide, a drum formed with exterior channels arranged to travel across the delivery end of said slide, fish propelling means arranged to operate on fish on said slide and in the channels of said drum, means for gaging the fish, and decapitating means operating on the fish at the upper part of said drum.

10. The combination of a fish-positioning slide, an endless carrier having exterior channels arranged to travel across the delivery end of said slide, fish propelling means extending above the lower part of said slide and continuing above the channels at the upper part of the carrier, means for gaging the fish, and decapitating means arranged to operate on the fish in said carrier.

11. The combination of a fish-positioning slide, a drum having exterior channels arranged to travel across the delivery end of said slide, a fish propelling brush arranged over the lower part of said slide and extending over the channels of said drum, the operative portion of said brush being concave, means for gaging the fish, and decapitating means arranged to operate on fish in the channels of said drum.

12. The combination of an endless series of channels movable sidewise for carrying the fish, gaging and decapitating means, fish positioning means, and means for propelling the fish head first into the ends of said channels and along the same to the gaging means.

13. The combination of a fish support on which the fish are caused to advance head foremost, a movable fish support arranged in communication with the first mentioned support, means for moving the second support laterally relative to the first support, and fish engaging means operating on the fish while on said first support and also operating on the fish when on said movable support, to propel the fish from the first support to the second support, and thereafter longitudinally on said second support.

14. The combination of a fish support on which the fish are caused to advance head foremost, a series of fish holding and guiding channels, means for moving said channels laterally relative to said fish support, and fish-engaging means operating on the fish while on said support and also operating on the fish when in said channels, to propel the fish on said support and into said channels, and thereafter longitudinally in said channels.

15. The combination of a fish support on which the fish are caused to advance head foremost, a series of fish holding and guiding channels, means for moving said channels laterally relative to said fish support, and resilient fish-engaging means operating on the fish while on said support and also operating on the fish when in said channels, to propel the fish on said support and into said channels, and thereafter longitudinally in said channels.

16. The combination of a fish support on which the fish are caused to advance head foremost, a series of fish holding and guiding channels, means for moving said channels laterally relative to said fish support, and fish-engaging brush bristles operating on the fish while on said support and also operating on the fish when in said channels, to propel the fish on said support and into said channels, and thereafter longitudinally in said channels.

17. In a machine for handling fish, a rotary drum having fish-carrying channels, a fish support leading to the receiving ends of said channels, cutting means adapted to operate on fish in said channels, and fish-propelling means extending over said support and over said channels.

18. In a machine for handling fish, a rotary drum having fish-carrying channels, a fish support leading to the receiving ends of said channels, cutting means adapted to operate on fish in said channels, and resilient fish-propelling means extending over said support and over said channels.

19. In a machine for handling fish, a rotary drum having fish-carrying channels, a fish support leading to the receiving ends of said channels, cutting means adapted to operate on fish in said channels, and fish-propelling means comprising a brush extending over said support and over said channels.

20. In a machine for handling fish, a rotary drum having fish-carrying channels, an inclined fish slide leading to the receiving ends of said channels, cutting means adapted to operate on fish in said channels, and fish-propelling means extending over said slide and over said channels.

21. In a machine for handling fish, the combination of a positioning slide to which said fish are delivered and on which the fish automatically turn and are propelled head first by gravity, movable channels for receiving the fish from said slide and arranged to eliminate the force of gravity as a propelling means and extending in the same general direction as the direction of movement of the fish when on said slide, means for moving the channels across said direction of movement so that they receive fish successively from the slide, and means for positively continuing the initial sliding of the fish and propelling them in said channels.

22. In a machine for handling fish, the combination of a positioning slide to which said fish are delivered and on which the fish automatically turn and are propelled head first by gravity, movable channels for receiving the fish from said slide and arranged substantially horizontally so as to eliminate the force of gravity as a propelling means and extending in the same general direction as the direction of movement of the fish when on said slide, means for moving the channels across said direction of movement so that they receive fish successively from the slide, and means for positively continuing the initial sliding of the fish and propelling them in said channels.

23. The combination of a slide on which the fish are caused to advance head foremost, a movable fish support arranged in communication with said slide so as to receive fish successively therefrom, means for moving the second support laterally relative to the first support, and fish engaging means operating on the fish while on said slide to propel them successively and in parallel positions on to said movable support.

24. In a machine for handling fish, the combination of a slide inclined with sufficient steepness on which the fish position themselves head-first as they slide by gravity, a series of channels communicating directly with the lower end of the slide to receive therein the fish as they leave the slide, said channels being on the exterior of a convex element, means for rotating said element to carry the positioned fish transversely from the slide, and means for propelling the fish relative to said slide and channels.

In testimony whereof I affix my signature hereto.

CHARLES W. GRAHAM.

Witnesses:
D. F. MENNIS,
W. L. BALD.